May 24, 1960    E. L. WOOD    2,937,901
TIRE TRIM
Filed Jan. 18, 1956    5 Sheets-Sheet 1
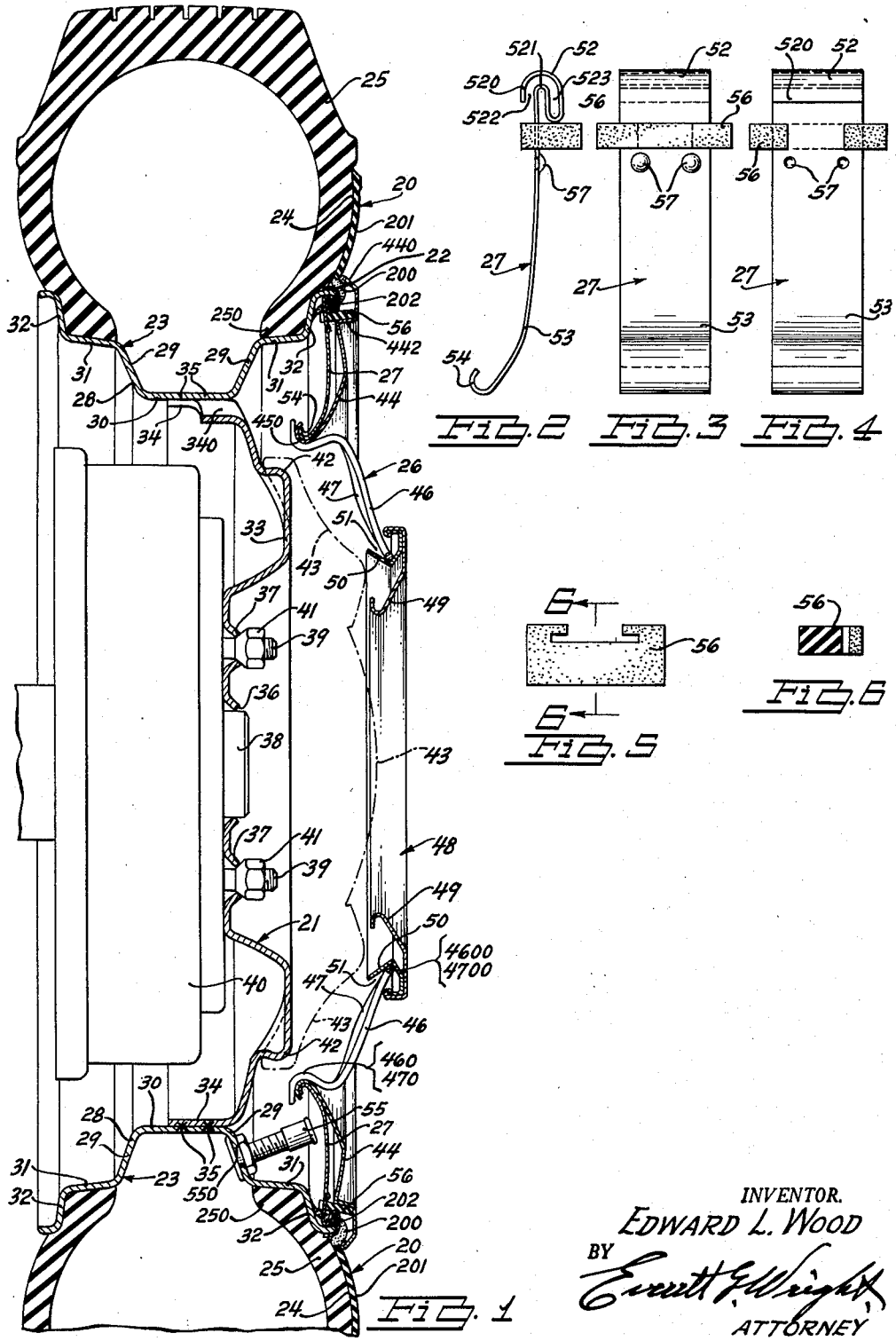
INVENTOR.
EDWARD L. WOOD
BY
ATTORNEY

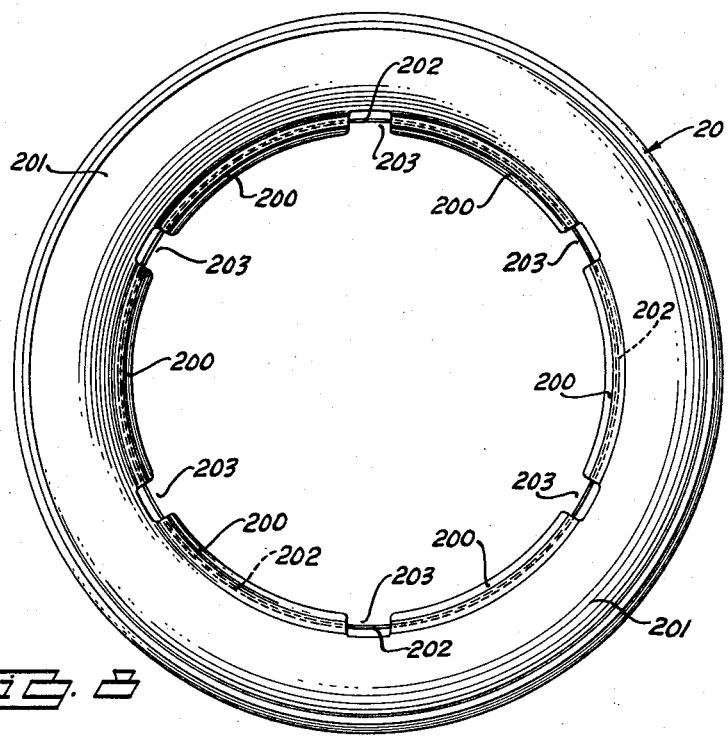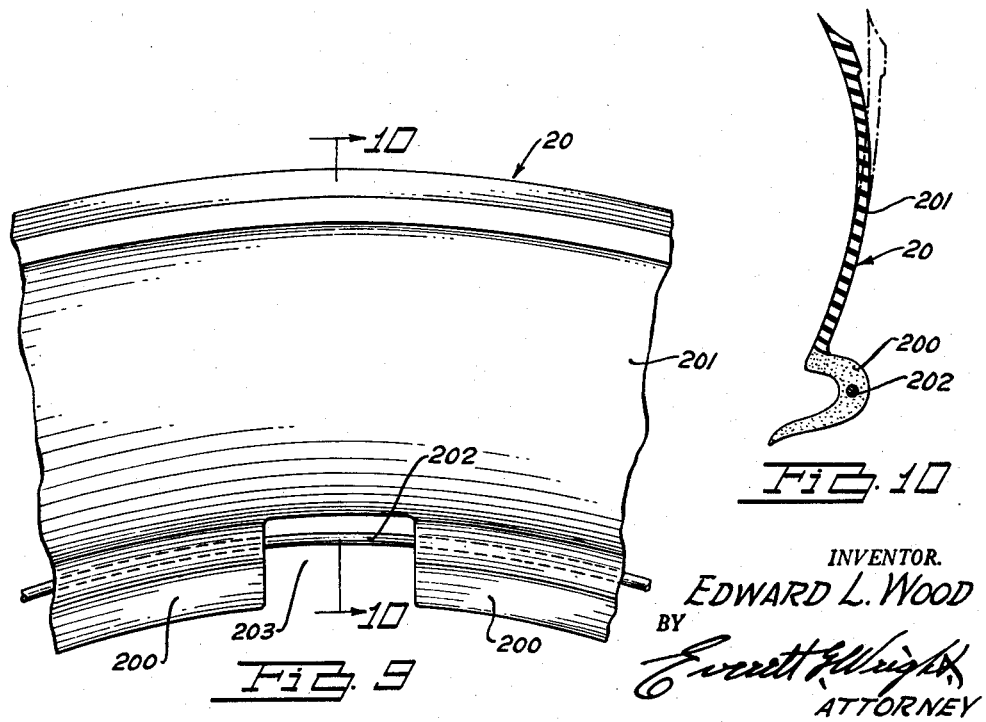

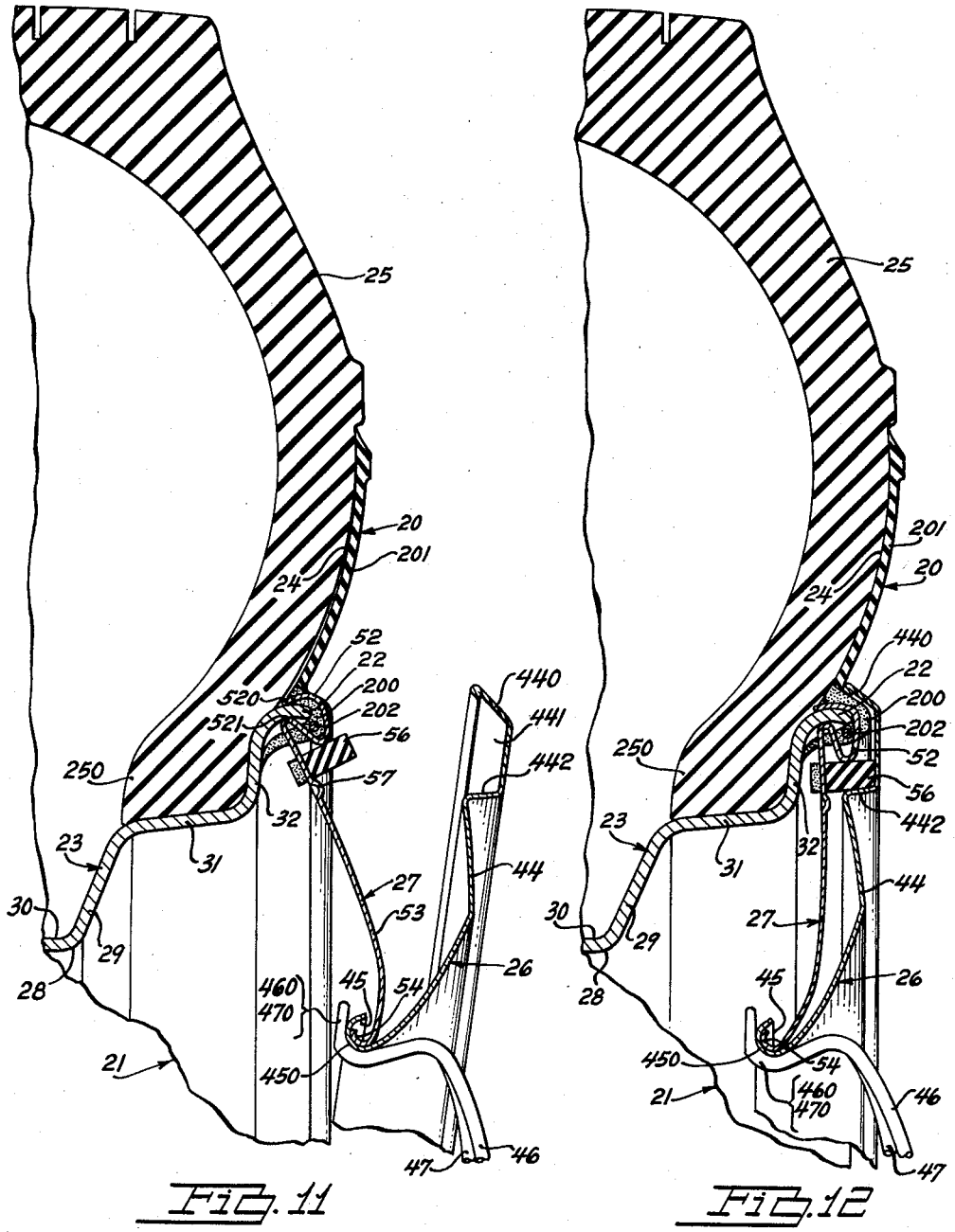

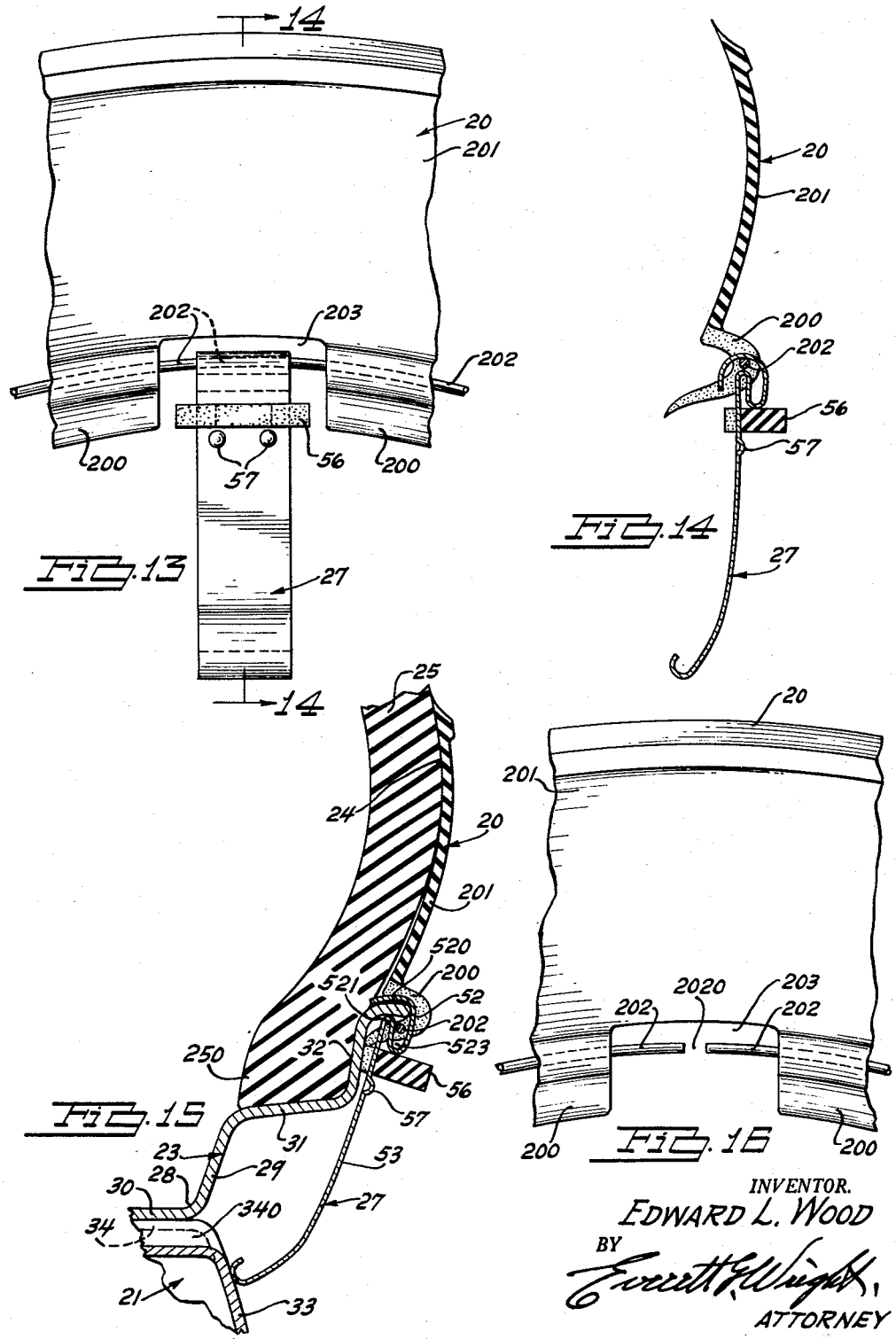

United States Patent Office 2,937,901
Patented May 24, 1960

2,937,901

TIRE TRIM

Edward L. Wood, Detroit, Mich., assignor, by direct and mesne assignments, to Gar Wood Industries, Inc., a corporation of Michigan Filed Jan. 18, 1956, Ser. No. 559,949

11 Claims. (Cl. 301—37)

In the prior art there have been many attempts to trim the side walls of tires by attaching thereto an annular strip of white or other colored rubber to provide a white or colored side wall effect without having to build the white or other colored side wall integrally into the tire casing. Because of the continued flexing and heating of tire side walls during use, the cementing or other means for the fixing of annular tire trim strips to the side walls of tires has proven unsatisfactory. Also, the prior art method of building an annular flap on the inner periphery of annular tire trim strips and securing the tire trim strip to the tire by inserting the annular flap thereof between the tire and the flange of the wheel rim on which the tire is mounted is considered undesirable and unsatisfactory, particularly because of leakage between tire bead and the wheel flange in modern tubeless tire installations and generally because of the additional time required to mount the tire and the tire trim precisely and correctly onto the wheel.

Conventional white side wall tire construction is considered undesirable because of the high cost of manufacture and due to the fact that the white rubber built into tire walls oft-times discolors and crazes long before the safe useful mileage of the tire has been consumed. Also, in the manufacture of conventional white side wall tires there are many rejects due to flows which develop during molding. And, in addition, the automobile dealer is placed to extra expense in changing from black to white side wall tires and vice versa to suit the customer's wishes.

With the foregoing in view, the primary object of the invention is to provide readily attachable and detachable white or colored side wall tire trim for conventional black wall tires.

Another object of the invention is to provide a white or colored side wall tire trim attachable to the tire by means independent of the tire and rim.

Another object of the invention is to provide a tire trim ring for the side wall of conventional tires which readily flexes with the flexing of the tire wall without permanent displacement on the tire and without causing leakage of air from the tire when used on modern tubeless tires.

Another object of the invention is to provide a white or colored side wall tire trim which may be secured to vehicle wheel rims at the lip thereof by clip means engaging the lip of the wheel rim, which clip means is employed also to secure wheel trim to the vehicle wheel and cause the wheel trim to hold the tire trim over the lip of the wheel rim and against the tire wall.

Another object of the invention is to provide, in combination, white or colored side wall tire trim, wheel trim, and clip means securing the wheel trim on the wheel, the said tire trim being beaded to overlie the lip of the wheel rim, and the wheel trim being formed to overlie the tire trim at the said tire trim bead to secure said tire trim onto said wheel and tire concentric with respect to the said tire and said wheel rim.

Another object of the invention is to provide the combination of a white or colored side wall tire trim and wheel trim and clip means disposed on the lip of the rim of a vehicle wheel engaging said wheel trim for holding said tire trim onto the vehicle wheel adjacent the tire thereon, the said tire trim including an annular bead disposable over the lip of the wheel rim and having an annular wire embedded therein, the said bead being notched at intervals to permit the said clip means to be positioned on said bead wire to space the same prior to engagement of said clips onto the wheel rim whereby to facilitate the mounting of the said clip means and the tire trim on said wheel rim and over said tire wall, the said clip means being adapted to urge said wheel trim over and axially into engagement with said tire trim bead whereby said wheel trim and said tire trim become removably secured over said wheel rim and said tire concentric thereto.

A further object of the invention is to provide in combination with a vehicle wheel and the tire thereon, an annular tire trim including a bead thereon positionable over the lip of the wheel rim and a wire reinforcement in said bead, wheel trim overlying said tire trim bead, and clip means securing said wheel trim on said wheel holding said tire trim concentrically on said wheel against said tire, the said wheel trim bead being notched out at intervals therearound and the said wire reinforcement being separated circumferentially at said notches whereby to facilitate the mounting of said tire trim on said clip means with the bead thereof over the lip of the wheel rim.

Other objects of the invention will become apparent by reference to the following detailed description taken in connection with the accompanying drawings, in which:

Fig. 1 is a sectional view of a vehicle wheel having a tire mounted thereon, tire trim on said tire including an annular wall portion and a bead portion overlying the lip of the rim of said wheel, wheel trim formed to engage said tire trim, and clip means positioned on said wheel rim engaging said wheel trim and urging the said wheel trim axially over said tire trim bead whereby to removably secure said wheel trim and said tire trim concentrically onto said wheel with the annular wall portion of said tire trim positioned firmly against the side wall of said tire.

Figs. 2, 3 and 4 are side, front and rear elevational views of a spring clip of a type that may be employed to secure the wheel trim in axial spring loaded relationship onto the wheel over said tire trim bead.

Fig. 5 is an enlarged elevational view of a centering block that may be employed on the spring clip.

Fig. 6 is a sectional view taken on the line 6—6 of Fig. 5.

Fig. 8 is an elevational view of a preferred form of tire trim embodying the invention.

Fig. 9 is an enlarged fragmentary view of the tire trim shown in Fig. 8.

Fig. 10 is a sectional view taken on the line 10—10 of Fig. 9 showing in full lines the cross sectional contour of the annular wall portion of the tire trim before placement on a wheel and tire, and in dot and dash lines the cross sectional contour of the annular wall portion of the tire trim when held firmly in place against the tire by the wheel trim and clip means.

Figure 7:
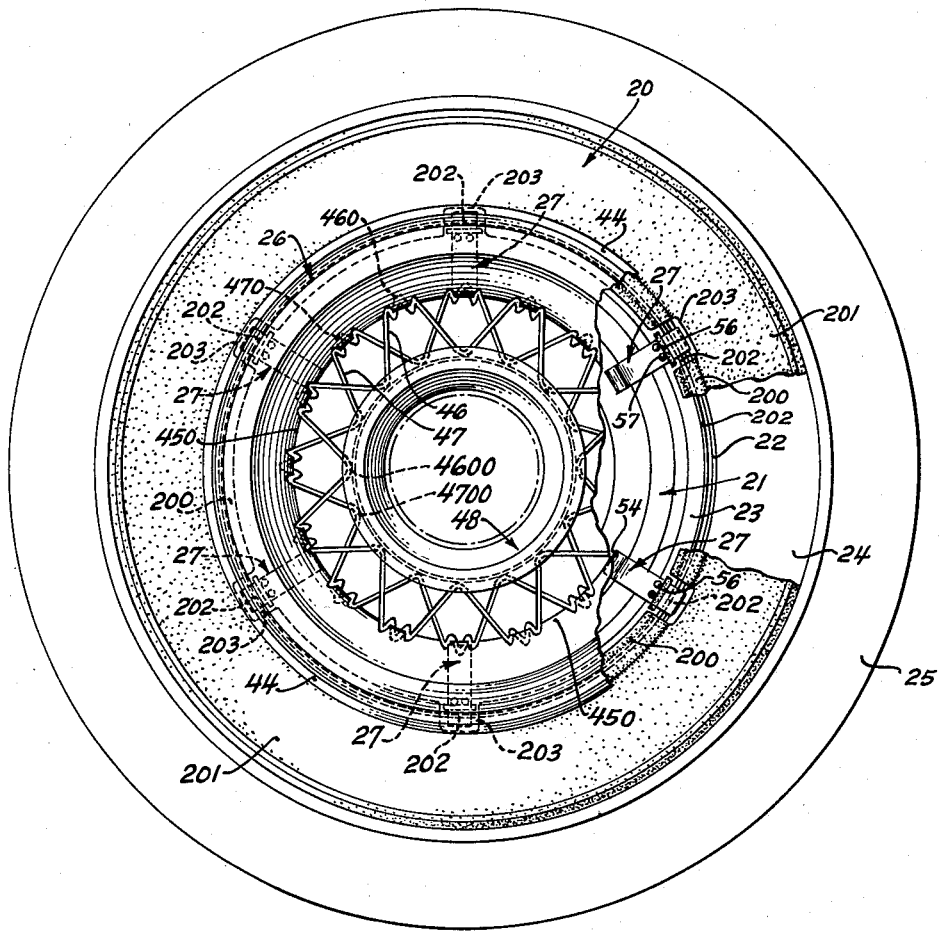
Fig. 7 is an elevational view of the wheel shown in Fig. 1 having thereon self-centering tire trim, wheel trim and clip means for securing said wheel trim and said tire trim concentrically onto said wheel.

Fig. 11 is an enlarged cross sectional view through a vehicle wheel and one of the wheel trim securing clips preferably employed to secure the wheel trim to the wheel, the wheel trim being held axially outwardly from the wheel by over-center action of the securing clip, the said vehicle wheel having a tire thereon and tire trim thereover positioned with its bead portion disposed over the lip of the rim and with the bead wire telescoped through said securing clip, the said tire trim being ready to be engaged and held concentrically onto said wheel by said wheel trim.

Fig. 12 is an enlarged cross sectional view similar to Fig. 11 except that the wheel trim has been pushed inwardly toward the wheel and the securing clips have moved over-center to urge the wheel trim axially onto the wheel with the wheel trim in engagement with said tire trim bead positioning itself and said tire trim concentrically over the lip of the wheel rim with the side wall of the tire trim disposed firmly over the side wall of said tire.

Fig. 13 is an enlarged fragmentary view similar to Fig. 9 showing a wheel trim securing clip hung onto the tire trim bead wire at a notch in said bead preparatory to engaging said clip onto the lip of the rim of a vehicle wheel.

Fig. 14 is a cross sectional view taken on the line 14—14 of Fig. 13.

Fig. 15 is a fragmentary sectional view showing the wheel trim clip engaged onto the lip of the wheel rim holding the tire trim relatively loosely in place by the bead wire thereof prior to the engagement of wheel trim by the lower end of the wheel trim clip as shown in Fig. 11.

Fig. 16 is a fragmentary view similar to Fig. 9 showing alternately how the bead wire of the tire trim may be separated at the notches in the bead thereof to permit the tire trim to be flexed onto the wheel trim securing clips after the said clips have been positioned onto the lip of the wheel rim.

Referring now to the drawings wherein like numerals refer to like and corresponding parts throughout the several views, the particular embodiment of the invention disclosed for illustrative purposes comprises a tire trim ring 20 of rubber or other resilient material having a bead 200 and an annular wall portion 201 which is formed for positioning onto a vehicle wheel 21 with the bead 200 thereof disposed over the lip 22 of the rim 23 of the vehicle wheel 21 and with the annular wall portion 201 thereof disposed against the side wall 24 of the tire 25 mounted on the said vehicle wheel 21. The resilient tire trim ring 20 may be white or any other selected color to match or be compatible with the color of any vehicle having its tires trimmed therewith. The said resilient tire trim ring 20 is secured concentrically onto the vehicle wheel 21 and against the side wall 24 of the tire 25 by means of wheel trim 26 axially positioned and secured onto the wheel 21 by a plurality of spring clips 27 connected onto the lip 22 of the wheel rim 23, which clips 27 axially urge the said wheel trim 26 over the lip 22 of the wheel rim 23 with the inner periphery or bead 200 of the tire trim ring 20 therebetween. The particular wheel trim 26 and the clip means 27 employed to secure it to the vehicle wheel 21 is shown herein for illustrative purposes as a part of the combination of elements used to hold the tire trim ring 20 concentrically onto the vehicle wheel 21, it being understood that wheel trim other than wheel trim 26 and wheel trim securing means other than the clip means 27 which function similarly to hold the tire trim ring 20 onto the vehicle wheel 21 and against the wall 24 of the tire 25 may be substituted therefor. Although the wheel trim 26 is shown as wheel trim simulating a wire wheel, the tire trim ring 20 may be secured onto the vehicle wheel 21 by other types of vehicle wheel trim axially positioned over the lip of the vehicle wheel rim such as wheel covers, wheel rings, and the like.

A typical vehicle wheel 21 is shown in Figs. 1 and 7 with a tubeless tire 25 mounted thereon which may be trimmed by a tire trim ring 20 according to the invention. The said vehicle wheel 21 has a drop center rim 23 composed of a central channel 28 having side walls 29 and a base 30. A tire bead seat 31 extends laterally outwardly from each of the channel side walls 29 and has a flange 32 extending upwardly therefrom which is curved at its upper portion to terminate in an axially disposed outer lip 22. Within the center of the drop center rim 23 is a spider 33 having an axially disposed flange 34 which generally is secured to the central channel 28 of the drop center rim 23 by such means as welding at 35. The spider 33 is provided with a hub aperture 36 and securing stud holes 37 to accommodate respectively the wheel hub 38 and the studs 39 extending from the brake drum 40 to which the wheel 21 is secured by means of the usual wheel securing nuts 41. The flange 34 of the spider 33 is generally scalloped out and formed at 340 at intervals around the periphery thereof to provide added structural strength to the vehicle wheel 21. The spider 33 is preferably provided with a plurality of hub cap retainer nubs 42 over which a hub cap indicated by the dot and dash lines 43 is sprung, the said nubs 42 retaining the hub cap 43 onto the vehicle wheel 21.

The wheel trim 26 shown for illustrative purposes is a wire wheel simulating wheel trim comprising a trim ring 44 having an inner annular grove 45 therein forming an inner rolled annular edge or bead 450 over which is sprung the outer hooked apexes 460 and 470 of staggered multipointed wire star shaped elements 46 and 47 which simulate the spokes of a wire wheel. Over the inner apexes 4600 and 4700 of the star shaped wire spoke simulating elements 46 and 47 is sprung a central ornamental collar 48 preferably formed of two pieces; namely, an outer ornamental ring 49 and an inner spoke engaging ring 50 having an annular groove 51 therein to accommodate the said inner apexes 4600 and 4700 of the star shaped spoke simulating elements 46 and 47. Obviously, any type of wheel trim may be substituted for the wire wheel simulating trim 26 for use with spring securing clips 27 as hereinafter described provided the substituted wheel trim includes an annular groove similar to the groove 45 in the wheel trim 26 to receive the said spring clips 27, and provided the substituted wheel trim is formed to extend annularly over the bead 200 of the tire trim ring 20.

The spring clips 27 preferably employed to secure the wheel trim 26 onto the vehicle wheel 21 are formed of strip spring steel to provide a reversedly bent and looped head 52 and a curved arm 53 having a wheel trim engaging loop 54 at the outer (radially inward) end thereof. The spring clips 27, preferably five or six of them, are sprung tightly onto the lip 22 of the flange 32 of the wheel rim 23 with the transverse edge of the free leg 520 of the looped head 52 thereof disposed in substantial abutment with the bead 250 of the tire 25 mounted on the drop center ring 23 in the manner required according to the type of tire used. The particular tire 25 illustrated is a modern tubeless tire. A valve stem 55 extends through the valve stem aperture 550 provided in the drop center rim channel 28. It will be noted that when the spring clips 27 are properly positioned on the lip 22 of the flange 32 of the wheel rim 23, the outer free leg 520 of the looped head 52 of the spring clips 27 and the inner reversedly bent edge 521 thereof grip opposite sides of the said lip 22 of the wheel flange 32 inwardly from the outer edge thereof as best shown in Figs. 11 and 12.

It will be noted by reference particularly to Figs. 11 and 12 that the reversedly bent and looped head 52 of the spring clip 27 distorts when the spring clip 27 is flexed over-center from its position shown in Fig. 12 to its position shown in Fig. 11. The extreme end edge of the outer free leg 520 of the looped head 52 of the spring clip 27 and reversedly bent edge 521 thereof grip the lip 22 of the rim 23 inwardly of the outer end thereof, and the end edge of the outer free leg 520 remains against the top of the lip of the rim while the reversedly bent edge pivots against the bottom of the lip of the rim. In the unloaded position of the spring clip 27 shown in Fig. 15, the arm 53 thereof is disposed inwardly toward the center of the wheel 21 against the wheel spider 33. If the trim ring 44 of the wheel trim 26 were narrower, the arm 53 of the spring clip 27 would be shorter and would dispose itself when unloaded inwardly toward the side wall 29 of the central channel 28 of the drop center rim 23.

To secure the wheel trim 26 to the vehicle wheel 21, the wheel trim engaging loop 54 at the free end of the curved arm 53 of each of the spring clips 27 is flexed from its position shown in Fig. 15 to slightly outwardly from its position shown in Fig. 11, and the said wheel trim engaging loop 54 of each of said spring clip 27 is engaged in the inner annular groove 45 of the wheel trim ring 44 of the wheel trim 26. The arms 53 of the spring clips 27 are sufficiently long that, when all or substantially all of them have their wheel trim engaging loop 54 engaged in the inner annular groove 45 of the wheel trim ring 44, the said spring clips 27 have an over-center action and will either hold the wheel trim ring 44 outwardly from the wheel rim 23 as shown in Fig. 11, or, if the wheel trim ring 44 is manually pushed toward the vehicle wheel 21 until an over-center action of the spring clips 27 in the opposite direction takes place, the said spring clips 27 will take over and constantly urge the wheel trim ring 44 with considerable force axially toward and over the lip 22 of the rim 23.

The tire trim ring 20 is preferably molded of a relatively live resilient rubber, either white or of any other desired color, and consists of an annular wall portion 201 and a bead portion 200. The said bead portion 200 is suitably formed to be disposed over the lip 22 of the wheel rim 23 as best shown in Figs. 1, 7, 8, 9, 10, 11, 12 and 15. A circular wire reinforcement 202 is preferably molded in the bead portion 200, and the said bead portion 200 is suitably notched out at 203 to accommodate the spring clips 27. In the embodiment of the invention shown in Figs. 1–15 inclusive, it is contemplated that the spring clips 27 be hung onto the wire reinforcement 202 of the tire trim ring 20 at the notches 203 therein prior to securing the spring clips 27 onto the lip 22 of the wheel rim 23 whereby to automatically locate the spring clips 27 at the proper spacing around the said lip 22 of the wheel rim 23. The said spring clips 27 are preferably secured onto the lip 22 of the rim 23 as shown in Fig. 15 by tapping the head 52 of the clips 27 with a hammer or the like after placing the opening 522 thereof opposite the said lip of the rim.

When the spring clips 27 are first hung onto the wire reinforcement 202 as shown in Figs. 13 and 14, and then are secured onto the lip 22 of the rim 23 as above described, the reinforcing wire 202 becomes positioned within the loop 523 of the spring clip 27, and the relationship of the bead 200 and the outer annular wall portion 201 of the tire trim ring 20 with respect to the tire 25 is substantially as indicated in Fig. 12. When the wheel trim ring 44 of the wheel trim 26 is urged forcibly by the over-center action of the spring clips 27 over the bead 200 of the tire trim ring 20, the outer flange 440 of the wheel trim ring 44 moves from its position shown in Fig. 11 to its position shown in Fig. 12 and engages the said bead 200 of the tire trim ring 20 and secures the tire trim ring 20 concentrically onto the vehicle wheel 21 as shown in Figs. 1, 7 and 12 with the bead 200 thereof disposed tightly against the lip 22 of the wheel rim 23 and with the annular wall portion 201 thereof positioned against the outer wall 24 of the tire 25. To accomplish the foregoing, the wheel trim ring 44 is particularly formed with an outer flange 440 as best shown in Fig. 12 complementary to the radially outer portion of the bead 200 of the tire trim ring 20 when positioned over the lip 22 of the wheel rim 23.

By reference to the alternate construction of the tire trim ring 20 shown in Fig. 16, it will be observed that the bead 200 thereof is reinforced by a circular reinforcement 202; however, the said circular reinforcement 202 is cut away at 2020 at the center of each notch 203 in the bead 200. This construction will permit the spring clips 27 to be placed first in the properly spaced circumferential relationship onto the lip 22 of the wheel rim 23 independent of the tire trim 20, and then the tire trim 20 may be placed onto the vehicle wheel 21 with the bead 200 thereof over the lip 22 of the rim 23 and with the free ends of the reinforcement wire 202 adjacent each cut-away 2020 telescoped into the loop 523 of the reversedly bent and looped head 52 of a spring clip 27. Thus the wheel trim 26 may be secured by the spring clips 27 to the vehicle wheel 21 prior to the use thereof to secure tire trim rings 20 onto the lip 22 of the rim 23 of the vehicle wheel 21 and against the wall of the tire 25 mounted thereon.

In cases where the wheel trim 26 is always employed in combination with a tire trim ring 20, a particularly suitable formation of the annular outer flange 440 of the trim ring 44 of the wheel trim 26 is all that is required or necessary to hold both the tire trim ring 20 and the wheel trim 26 concentric with respect to the vehicle wheel 21. However, in the event it is desirable to use the wheel trim 26 only on the vehicle wheel 21, an inwardly facing annular channel or groove 441 may be formed at the outer periphery of the trim ring 44, the outer annular flange 440 of the trim ring 44 forming one wall of the said annular channel or groove 441, and a radially disposed annular wall 442 in the trim ring 44 forming the other wall of the said annular channel or groove 441. The said inner annular wall 442 of the annular channel or groove 441 is preferably sloped generally opposite to the slope of the outer annular flange 440 of the trim ring 44 for the purpose hereinafter described.

The foregoing inwardly facing annular channel or groove 441 at the outer periphery of the trim ring 44 of the wheel trim 26 telescopes over rubber cushioning and centering blocks 56 mounted on the spring clips 27 as best shown in Figs. 2, 3, 4 and 11. The said cushioning and centering blocks 56, when used to center and cushion the trim ring 44 of the wheel trim 26 onto the vehicle wheel 21 in instances when the bead 200 of the tire trim ring 20 does not perform that function, are contacted by the sloping annular inner wall 422 of the channel or grove 441 of the trim ring 44 as the said trim ring 44 of the wheel trim 26 moves from its extended position shown in Fig. 11 to its axially inward position shown in Fig. 12 responsive to over-center action of the spring clips 27 as hereinbefore described. The inner wall 422 of the channel or groove 441 coacts with the cushioning and centering blocks 56 carried by the spring clips 27 to cushion the wheel trim 26 and to hold the said wheel trim concentrically disposed on the vehicle wheel 21. Such means as projections 57 on the spring clips 27 maintain the said cushioning and centering blocks 56 positioned adjacent the reversedly bent and looped head 52 thereof. If the cushioning and centering blocks 56 are used in wheel trim installations where a tire trim ring 20 is also used, the wheel trim ring 44 of the wheel trim 26 is centered and cushioned by both the outer wall 440 of the annular channel or groove 441 contacting the bead 200 of the tire trim 20 and the inner wall 442 of the said annular channel or groove 441 contacting cushioning and centering blocks 56 on the spring clips 27. As hereinbefore indicated, the cushioning and centering blocks 56 are preferably used to center the wheel trim 26 on the vehicle wheel 21 when the tire trim 20 is not employed, and, whenever the tire trim 20 is employed, the said cushioning and centering blocks 56 may be omitted or removed since the wheel trim ring 44 of the wheel trim 26 is formed with an outer annular flange at 440 to coact with the bead 200 of the tire trim 20 under axial force exerted by the spring clips 27 to cause the wheel trim 26 to center and cushion the wheel trim onto the vehicle wheel 21 simultaneously with securing the tire trim 20 concentrically onto the vehicle wheel 21 with the bead 200 thereof over the lip 22 of the rim 23 of the said vehicle wheel 21 and with the annular wall portion 201 of the tire trim 20 disposed firmly against the wall of the tire 25 mounted on the said vehicle wheel 21.

Although but one embodiment of the invention and one alternative construction have been shown in the drawings and described in detail, it is obvious that many changes may be made in the size, shape, arrangement and detail of the various elements of the invention without departing from the spirit and scope thereof as defined by the appended claims.

I claim:

1. In combination, tire trim for tires of vehicle wheels comprising an annular resilient tire trim ring composed of an inner bead portion formed to overlie the lip of the wheel rim and having a plurality of notches therearound and an outer annular wall portion adapted to conform to the wall of the vehicle tire responsive to axial pressure applied to said tire trim at said bead, and wheel trim including means disposed opposite said notches in said tire trim bead securing said wheel trim with axial pressure onto said wheel over the lip of the rim thereof and over said tire trim bead circumferentially outwardly of said wheel rim lip.

2. In combination with wheel trim and wheel trim securing means fixed onto the rim of a vehicle wheel securing said wheel trim with axial pressure onto said vehicle wheel, tire trim for the tire of said vehicle wheel comprising an annular resilient tire trim ring composed of an inner bead portion formed to overlie the lip of the wheel rim and notched at intervals therearound to accommodate said wheel trim securing means disposed on said wheel rim, and an outer annular wall portion adapted to conform to the wall of the vehicle tire responsive to axial pressure applied by said wheel trim to said tire trim at said bead.

3. In combination with wheel trim and wheel trim securing means fixed onto the rim of a vehicle wheel securing said wheel trim with axial pressure onto said vehicle wheel, tire trim for the tire of said vehicle wheel comprising an annular resilient tire trim ring composed of an inner bead portion including a circular wire reinforcement formed to overlie the lip of the wheel rim and notched at intervals therearound to accommodate said wheel trim securing means disposed on said wheel rim, and an outer annular wall portion adapted to conform to the wall of the vehicle tire responsive to axial pressure applied by said wheel trim to said tire trim at said bead.

4. In combination, tire trim for tires of vehicle wheels comprising an annular resilient tire trim ring composed of an inner bead portion formed to overlie the lip of the wheel rim and having a plurality of notches therearound and an outer annular wall portion adapted to conform to the wall of the vehicle tire responsive to axial pressure applied to said tire trim at said bead, the said tire trim bead portion including a circular wire reinforcement embedded therein and exposed at said notches, and wheel trim including means securing said wheel trim axially onto said wheel and over said tire trim bead telescoped onto said tire trim bead reinforcement at the said notches in said bead and fixed onto the lip of the wheel rim.

5. In combination with wheel trim and wheel trim securing means fixed onto a vehicle wheel and securing said wheel trim with axial pressure onto said vehicle wheel over the lip of the rim thereof, tire trim for the tire of said vehicle wheel comprising an annular resilient tire trim ring composed of an outer annular wall portion and inner bead portion including a circular wire reinforcement therein, the said inner bead portion being formed to overlie the lip of the wheel rim under said wheel trim and notched at intervals therearound to expose the wire reinforcement thereof, the said wheel trim securing means engaging the exposed wire reinforcement of said tire trim to hold said tire trim relatively loosely on said wheel prior to axial engagement of the inner bead portion of said tire trim by said wheel trim, the said axial engagement of the inner bead portion of the tire trim by said wheel trim causing the outer annular wall portion of said tire trim to conform to the wall of the vehicle tire responsive to the axial pressure of said securing means securing said wheel trim onto said vehicle wheel.

6. In combination with wheel trim and wheel trim securing means fixed onto the lip of the rim of a vehicle wheel and adapted to urge said wheel trim securely onto said vehicle wheel with axial pressure against the lip of the rim thereof, tire trim for the tire of said vehicle wheel comprising an annular resilient tire trim ring composed of an outer annular wall portion and inner bead portion including a circular wire reinforcement therein, the said inner bead portion of said tire trim being disposed over the lip of the rim of said vehicle wheel and under said wheel trim and notched at intervals therearound to expose said wire reinforcement, said wheel trim securing means engaging said tire trim at the exposed reinforcement thereof to hold said tire trim relatively loosely on said wheel prior to said wheel trim being urged by said wheel trim securing means into engagement with said tire trim and holding it firmly onto said wheel.

7. In combination, tire trim for tires of vehicle wheels comprising an annular resilient tire trim ring composed of an inner bead portion formed to overlie the lip of the wheel rim and having a pluralitiy of notches therearound and an outer annular wall portion adapted to conform to the wall of the vehicle tire and responsive to axial pressure applied to said tire trim at said bead on a periphery thereof radially outwardly in respect to the said lip of the wheel rim, and wheel trim including an annular outer peripheral portion formed to overlie the tire trim bead and means disposed opposite said notches in said tire trim bead securing said wheel trim with axial pressure onto said wheel and centering said tire trim and said wheel trim onto said wheel.

8. In combination, tire trim for tires of vehicle wheels comprising an annular resilient tire trim ring composed of an inner bead portion having a plurality of notches therearound formed to overlie the lip of the wheel rim and an outer annular wall portion adapted to conform to the wall of the vehicle tire responsive to axial pressure applied to said tire trim at said bead, the said tire trim bead portion including a circular wire reinforcement embedded therein and exposed at said notches, and wheel trim including an annular outer peripheral portion formed to overlie the tire trim bead, and means securing said wheel trim axially onto said wheel and over said tire trim bead telescoped onto said tire trim bead reinforcement at the said notches in said bead and fixed onto the lip of the wheel rim, the said outer peripheral portion of said wheel trim and the said tire trim bead coacting with each other and the lip of the wheel rim to center the tire trim on said wheel under the pressure of said wheel trim securing means urging said wheel trim axially onto said wheel.

9. In combination with wheel trim and wheel trim securing clip means having a looped head fixed onto a vehicle wheel and an extending arm engaging said wheel trim and releasably securing said wheel trim with axial pressure onto said vehicle wheel over the lip of the rim thereof, tire trim for the tire of said vehicle wheel comprising an annular resilient tire trim ring composed of an outer annular wall portion and inner bead portion including a circular wire reinforcement therein, the said inner bead portion being formed to overlie the lip of the wheel rim under said wheel trim and notched at intervals therearound to expose the wire reinforcement thereof, the looped head of the said wheel trim securing means being engaged by the exposed wire reinforcement of said tire trim to hold said tire trim relatively loosely on said wheel prior to axial engagement of the inner bead portion of said tire trim by said wheel trim, the said axial engagement of the inner bead portion of the tire trim by said wheel trim under axial pressure causing the outer annular wall portion of said tire trim to conform to the wall of the vehicle tire.

10. In combination with wheel trim and wheel trim securing clip means having a looped head fixed onto a vehicle wheel and an extending arm engaging said wheel trim and releasably securing said wheel trim with axial pressure onto said vehicle wheel over the lip of the rim thereof, tire trim for the tire of said vehicle wheel comprising an annular resilient tire trim ring composed of an outer annular wall portion and inner bead portion including a circular wire reinforcement therein, the said inner bead portion being formed to overlie the lip of the wheel rim under said wheel trim and notched at intervals therearound to expose the wire reinforcement thereof, the said wire reinforcement being parted at said notches to permit engagement into the looped head of said clip means after said clip means have been fixed onto the vehicle wheel to hold the said tire trim relatively loosely on said wheel prior to axial engagement of the inner bead portion of said tire trim by said wheel trim, the said axial engagement of the inner bead portion of the tire trim by said wheel trim under axial pressure causing the outer annular wall portion of said tire trim to conform to the wall of the vehicle tire.

11. In combination with wheel trim and wheel trim securing means fixed onto the lip of the rim of a vehicle wheel and adapted to urge said wheel trim securely onto said vehicle wheel with axial pressure against the lip of the rim thereof, tire trim for the tire of said vehicle wheel comprising an annular resilient tire trim ring composed of an outer annular wall portion and inner annular bead portion including a circular wire reinforcement therein, the said inner bead portion of said tire trim being disposed over the lip of the rim of said vehicle wheel and under said wheel trim and notched at intervals therearound to expose said wire reinforcement, the said inner annular bead portion of said tire trim ring and the outer periphery of said wheel trim being complementarily formed at least to the extent that the outer peripheral edge of said wheel trim overlies the bead portion of the tire trim, the said wheel trim securing means engaging said tire trim at the exposed reinforcement thereof to hold it relatively loosely on said wheel prior to said wheel trim being urged by said wheel trim securing means axially into engagement with said tire trim and holding both said wheel trim and said tire trim firmly and concentrically onto said wheel with the outer annular wall portion of said tire trim disposed against the outer wall of said tire.

References Cited in the file of this patent

UNITED STATES PATENTS

| | | |
|---|---|---|
| 2,351,655 | Aske | June 30, 1944 |
| 2,455,151 | Wood | Nov. 30, 1948 |
| 2,819,119 | Perrin | Jan. 7, 1958 |

FOREIGN PATENTS

| | | |
|---|---|---|
| 1,061,278 | France | Nov. 25, 1953 |